E. U. MACK.
SAFETY DEVICE FOR AUTOMOBILES.
APPLICATION FILED JUNE 18, 1915.
1,173,826.
Patented Feb. 29, 1916.
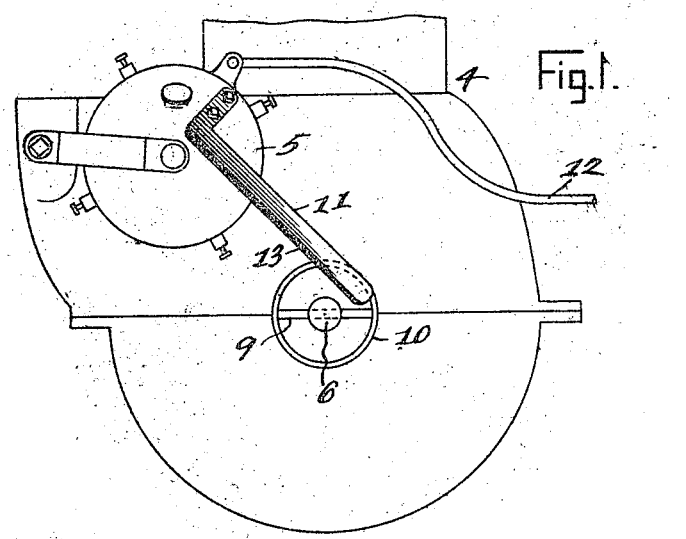
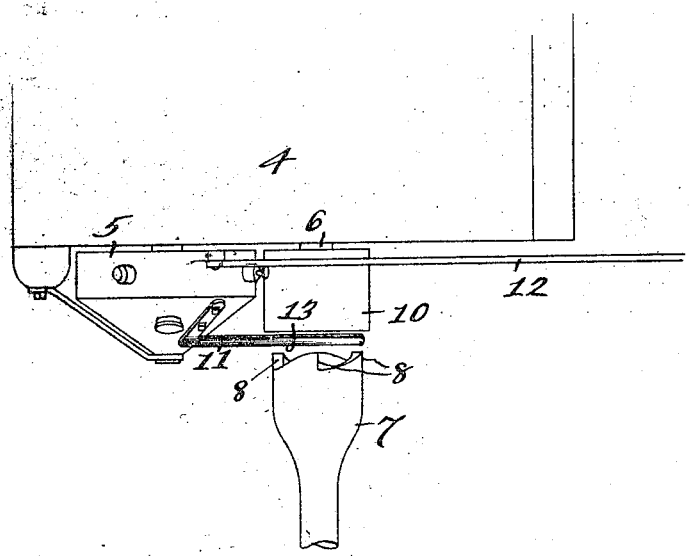
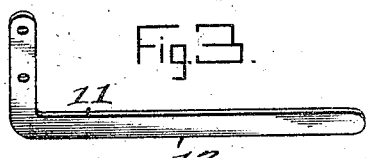
WITNESSES:
INVENTOR
Ernest U. Mack
BY
ATTORNEYS

UNITED STATES PATENT OFFICE.

ERNEST U. MACK, OF FLORENCE, SOUTH CAROLINA.

SAFETY DEVICE FOR AUTOMOBILES.

1,173,826.

Specification of Letters Patent. Patented Feb. 29, 1916.

Application filed June 18, 1915. Serial No. 34,860.

*To all whom it may concern:*

Be it known that I, ERNEST U. MACK, a citizen of the United States, and a resident of Florence, in the county of Florence and State of South Carolina, have invented a certain new and useful Safety Device for Automobiles, of which the following is a specification.

My invention relates to the starting of internal combustion engines, as in automobiles, particularly of the Ford type, and the main object thereof is to provide means preventing the starting of an engine unless the commutator is in the correct position for starting the engine, as, if the commutator should be "advanced" when the crank is joined to the crank-shaft and revolved to rotate the said shaft, back-fire results and a broken arm may result.

A further object is to provide simple means for preventing crank and crank-shaft connection, unless the parts are in proper starting positions, in the form of a quickly and readily applied attachment.

A further object is to so form the attachment as to be engaged and moved by the crank in the effort to unite crank and crank-shaft to move the commutator to proper starting position automatically and thus obviate the necessity for walking around to the steering column to adjust said commutator.

My invention is fully described in the following specification, of which the accompanying drawings form a part, in which like characters refer to like parts in each of the views, and in which:—

Figure 1 is a front elevation of a "Ford" engine having a commutator thereon and to the case of which my invention is applied; Fig. 2 is a plan view thereof, and showing the relative positions of the crank and crank-shaft, with my invention interposed therebetween; and Fig. 3 is a detached view of a simple form of my invention, as used on a Ford car.

In the drawings forming a part of this application I have shown a present preferred embodiment of my invention as applied to an engine 4 having a commutator case 5, a crank-shaft 6 and an operating crank 7 for starting the engine provided with teeth 8 adapted for engagement with a transverse pin 9 secured to the crank-shaft, within the fan belt pulley 10 in the form shown. Secured in any desired manner to the commutator case 5 is an arm 11 which is adapted to be moved downwardly in front of the pulley 10 when the spark-lever at the driver's seat of an automobile is advanced, a rod 12 being in pivotal connection with the commutator case 5 and with the spark-lever, not shown.

By reference to Figs. 1 and 2 it will be obvious that the crank cannot be moved toward the engine sufficiently far to engage the crank-shaft, being prevented by the arm 11, and this arm must be moved out of the position shown before the engine can be cranked. This may be done, as stated, from the driver's seat, by moving the spark-lever toward "retard" but I prefer to provide a slightly advanced shoulder 13 at the under side of the arm 11 whereby the teeth 8 will engage said arm when the crank is rotated in starting or cranking direction and move said arm 11 out of the position shown and thus allow the crank to move toward the engine for shaft engagement, and this movement of the arm 11 by the crank moves the commutator case toward its proper position for engine starting.

It will thus be seen that the engine cannot be cranked while the commutator is advanced and safety from the "kicking" of the engine results; the attachment is very simple and very low in cost of manufacture and installation; the crank moves the commutator to safety position in the operation of turning the crank to engage the same with the shaft to start the engine; and the attachment does not interfere in any way with the normal operation or adjustment of the parts of the engine.

While I have shown only one form of the device it will be obvious that I am not limited thereto, as many forms thereof might be employed, especially for different types of engines, and still be within the spirit of my invention and the scope of the following claims.

Having fully described my invention, what I claim as new, and desire to secure by Letters Patent, is:—

1. The combination in an internal combustion engine provided with a crank-shaft, a starting crank, and a commutator, of means carried by said commutator for preventing the operative connection of said crank and crank-shaft when said commutator is advanced from starting position, said means being rendered inoperative by the rotation of said crank, thereby moving said commutator to starting position.

2. The combination in an internal combustion engine provided with a crank-shaft, a starting crank having teeth thereon, and a commutator, of means carried by said commutator for preventing the operative connection of said crank and crank-shaft when said commutator is advanced from starting position, said means being engaged by said teeth in the rotation of said crank and moved into inoperative position thereby moving said commutator to starting position.

3. The combination in an internal combustion engine provided with a crank-shaft, a starting crank, and a commutator, of an arm rigidly secured to said commutator and projected into the path of crank movement toward the crank-shaft when said commutator is advanced from starting position, and means on said crank in its rotation for engagement with said arm to move the latter out of its operative position and thus move said commutator to starting position.

In testimony whereof I have signed my name to this specification in the presence of two subscribing witnesses.

ERNEST U. MACK.

Witnesses:
EARLIE E. JORDON,
I. J. CREECH.